No. 820,047.  
PATENTED MAY 8, 1906.  
C. J. HIRLIMANN.  
DRY BATTERY.  
APPLICATION FILED MAY 25, 1905.
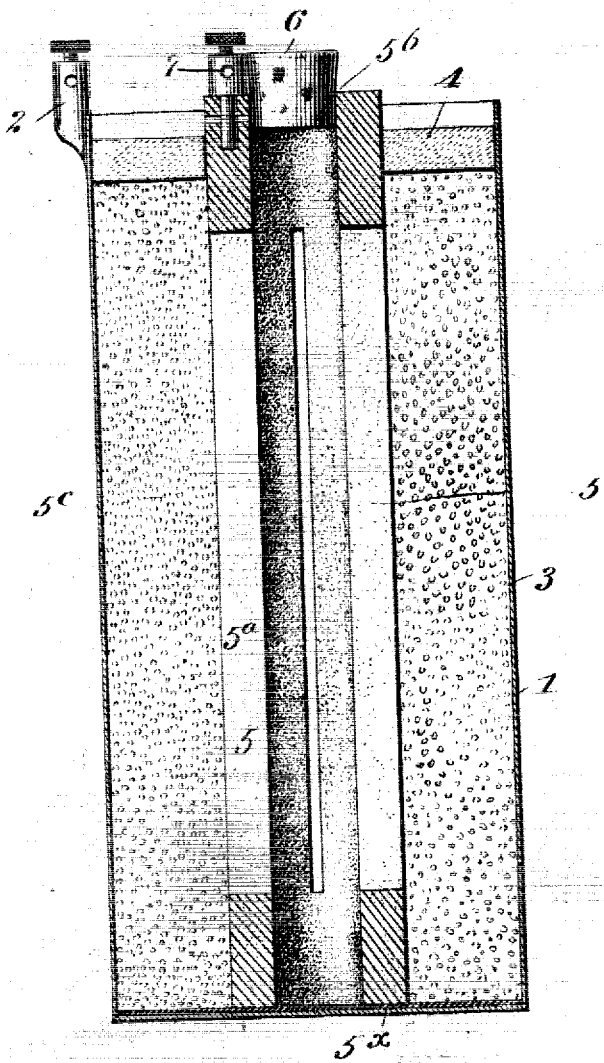

UNITED STATES PATENT OFFICE.

CHARLES J. HIRLIMANN, OF FORT LEE, NEW JERSEY.

DRY BATTERY.

No. 820,047.  Specification of Letters Patent.  Patented May 8, 1906.

Application filed May 25, 1905. Serial No. 262,171.

*To all whom it may concern:*

Be it known that I, CHARLES J. HIRLIMANN, a citizen of the United States, residing at Fort Lee, in the county of Bergen and State of New Jersey, have invented certain new and useful Improvements in Dry Batteries, of which the following is a full, clear, and exact description.

My invention relates to renewable dry batteries.

In the use of the ordinary form of dry battery an objection is found on account of the comparatively short life of the usual cell sold upon the market, necessitating frequent renewals, and thereby incurring great inconvenience and expense. The ordinary dry battery upon the market is composed of zinc and carbon elements separated by an absorbent material which is impregnated with the active material, generally sulfuric acid, any ordinary depolarizer, such as dioxid of manganese, being also incorporated into the cell to prevent the zinc element from becoming coated with hydrogen bubbles. Owing, however, to the fact that the absorbent material, generally sawdust, takes up a great deal of space and is wholly neutral in the electrochemical actions of the cell, only a very small amount of active or exciting material can be introduced therein, which is soon exhausted by use or evaporates by lapse of time. Since the cell is ordinarily sealed up, it is not convenient to renew this active material, and even if the interior of the cell were made accessible it would take a considerable time for the absorbent material within the cell to soak up and absorb the necessary amount of the reagent. On these accounts no attempt is ordinarily made to renew the active material of a dry cell, the battery being generally thrown away when exhausted.

The object of my invention is to provide a form of construction whereby the active material within the cell may be renewed from time to time as the same becomes exhausted, and this in an easy and convenient way.

With this and other objects in view my invention consists in the construction, combination, location, and arrangement of parts, all as will be more fully hereinafter set forth, as shown in the accompanying drawing, and finally pointed out in the appended claim.

The drawing illustrates a longitudinal sectional view of a dry-battery cell embodying the principles of my invention.

1 designates the cup or outer casing of the cell, which is ordinarily made of zinc and constitutes the negative pole of the battery. 2 designates an ordinary binding post or screw soldered or otherwise connected to said casing 1. 3 indicates the filling of the cell, which may be composed of sawdust impregnated with dilute sulfuric acid and peroxid of manganese. 4 is a sealing material of any sort—such as pitch, sealing-wax, or paraffin—which is flowed into the cell after the parts have been organized into position and is effective to hold said parts in position and prevent the evaporation of the liquids within the cell. All these features of the battery up to this point are of the common and well-known construction and form no part of my present invention. It is obvious that the invention is applicable to any type of cell and is not limited to those having the characteristics above stated.

5 denotes the negative element of the battery which I have shown in the form of a carbon block resting on the usual insulating-plate $5^x$ and having the cavity $5^a$ therein and an orifice $5^b$ at the upper portion thereof. The carbon block contains a communicating channel or channels $5^c$, leading from the cavity $5^a$ outward into the surrounding portion of the cell. A block, stopper, or closure of any sort, 6, is inserted into the orifice $5^b$ at the top of the carbon block and is effective to normally seal said cavity.

7 denotes a binding post or screw upon the carbon element.

While I have described a positive element composed of carbon and of circular form, I do not desire to be limited or restricted thereto, since it is obvious that any desired material may be substituted therefor having a square, oblong, elliptical, polygonal, or any other shape, and the form of the cavities and channels $5^c$ may be correspondingly changed. I have shown the channels $5^c$ in the form of narrow longitudinal slots in the walls of the element, and I have found this construction to be convenient and effective in practice; but circular perforations or transverse slots or orifices of other form could be used, if desired.

In the operation of my device the battery is placed upon the market in the form shown and is used in the usual way until the same becomes exhausted. When that occurs, the block or stopper 6 is removed and the cavity $5^a$ within the carbon element is filled with a suitable exciting fluid. The cavity is of sufficient size to accommodate precisely the right amount of the reagent. When this has been accomplished, the stopper is replaced and the battery laid aside. The exciting fluid will pass through the channels 5 and after a certain length of time will percolate throughout the entire mass of the absorbent substance 3, whereupon the battery will be recharged and restored to its original active condition.

What I claim is—

A dry battery comprising a zinc cup or outer casing containing absorbent material, a carbon element therein having a straight cylindrical hole throughout its length and having narrow radial slots in the wall thereof, said slots extending from a point near the top of the carbon element to a point near the bottom thereof and of a width insufficient to permit the entrance of the sawdust or similar material therethrough, whereby the exciting material or reagent may be run into the hole to fill the same and afterward pass through the slot to impregnate the absorbent material to a predetermined degree of saturation, and a stopper or closure inserted into the upper end of the hole in said carbon element.

In witness whereof I subscribe my signature in the presence of two witnesses.

CHARLES J. HIRLIMANN.

Witnesses:
FRANK S. OBER,
WALDO M. CHAPIN.